United States Patent

Walsh

[11] Patent Number: 6,096,450
[45] Date of Patent: Aug. 1, 2000

[54] FUEL CELL ASSEMBLY FLUID FLOW PLATE HAVING CONDUCTIVE FIBERS AND RIGIDIZING MATERIAL THEREIN

[75] Inventor: Michael M. Walsh, Fairfield, Conn.

[73] Assignee: Plug Power Inc., Latham, N.Y.

[21] Appl. No.: 09/022,133

[22] Filed: Feb. 11, 1998

[51] Int. Cl.⁷ ................................................ H01M 8/02
[52] U.S. Cl. .......................................... 429/34; 29/623.5
[58] Field of Search .............................. 429/12, 34, 38, 429/39; 29/623.5, 623.1; 427/115

[56] References Cited

U.S. PATENT DOCUMENTS

| | | |
|---|---|---|
| 2,234,732 | 3/1941 | Haunz . |
| 3,764,391 | 10/1973 | Warszawski et al. . |
| 3,819,413 | 6/1974 | Nippe et al. . |
| 4,339,322 | 7/1982 | Balko et al. ........................... 429/38 X |
| 4,548,876 | 10/1985 | Bregoli ...................................... 429/39 |
| 4,745,038 | 5/1988 | Brown ...................................... 429/27 |
| 5,035,962 | 7/1991 | Jensen ...................................... 429/40 |
| 5,114,812 | 5/1992 | Disselbeck et al. ..................... 429/234 |
| 5,151,334 | 9/1992 | Fushimi et al. ............................ 429/32 |
| 5,236,687 | 8/1993 | Fukuda et al. ......................... 429/44 X |
| 5,521,018 | 5/1996 | Wilkinson et al. .......................... 42/26 |
| 5,527,363 | 6/1996 | Wilkinson et al. ..................... 29/623.1 |
| 5,531,019 | 7/1996 | Taira et al. .............................. 29/623.5 |

FOREIGN PATENT DOCUMENTS

| | | | |
|---|---|---|---|
| 0029124 | 5/1981 | European Pat. Off. | ......... H01M 4/96 |
| 8-45530 | 2/1996 | Japan . | |

*Primary Examiner*—Maria Nuzzolillo
*Assistant Examiner*—Jonathan Crepeau
*Attorney, Agent, or Firm*—Heslin & Rothenberg, P.C.

[57] ABSTRACT

A fluid flow plate is preferably formed with three initial sections, for instance, two layers of conductive (e.g., metal) fibers and a barrier material (e.g., metal foil) which is interposed between the two layers. For example, sintering of these three sections can provide electrical path(s) between outer faces of the two layers. Then, the sintered sections can be, for instance, placed in a mold for forming of flow channel(s) into one or more of the outer faces. Next, rigidizing material (e.g., resin) can be injected into the mold, for example, to fill and/or seal space(s) about a conductive matrix of the electrical path(s). Preferably, abrading of surface(s) of the outer face(s) serves to expose electrical contact(s) to the electrical path(s).

24 Claims, 5 Drawing Sheets

FUEL CELL ASSEMBLY FLUID FLOW PLATE HAVING CONDUCTIVE FIBERS AND RIGIDIZING MATERIAL THEREIN

STATEMENT OF GOVERNMENT RIGHTS

The Government of the United States of America has rights in this invention pursuant to Contract No. DE-AC02-94CE50389 awarded by the U.S. Department of Energy.

TECHNICAL FIELD

This invention relates, generally, to fuel cell assemblies and, more particularly, to construction of fluid flow plates for fuel cell assemblies.

BACKGROUND ART

Fuel cells electrochemically convert fuels and oxidants to electricity, and fuel cells can be categorized according to the type of electrolyte (e.g., solid oxide, molten carbonate, alkaline, phosphoric acid, or solid polymer) used to accommodate ion transfer during operation. Moreover, fuel cell assemblies can be employed in many (e.g., automotive to aerospace to industrial) environments, for multiple applications.

A Proton Exchange Membrane (hereinafter "PEM") fuel cell converts the chemical energy of fuels such as hydrogen and oxidants such as air/oxygen directly into electrical energy. The PEM is a solid polymer electrolyte that permits the passage of protons (i.e., $H^+$ ions) from the "anode" side of a fuel cell to the "cathode" side of the fuel cell while preventing passage therethrough of reactant fluids (e.g., hydrogen and air/oxygen gases). Some artisans consider the acronym "PEM" to represent "Polymer Electrolyte Membrane." The direction, from anode to cathode, of flow of protons serves as the basis for labeling an "anode" side and a "cathode" side of every layer in the fuel cell, and in the fuel cell assembly or stack.

Usually, an individual PEM-type fuel cell has multiple, generally transversely extending layers assembled in a longitudinal direction. In the typical fuel cell assembly or stack, all layers which extend to the periphery of the fuel cells have holes therethrough for alignment and formation of fluid manifolds that generally service fluids for the stack. As is known in the art, some of the fluid manifolds distribute fuel (e.g., hydrogen) and oxidant (e.g., air/oxygen) to, and remove unused fuel and oxidant as well as product water from, fluid flow plates which serve as flow field plates of each fuel cell. Also, other fluid manifolds circulate coolant (e.g., water) for cooling.

As is known in the art, the PEM can work more effectively if it is wet. Conversely, once any area of the PEM dries out, the fuel cell does not generate any product water in that area because the electrochemical reaction there stops. Undesirably, this drying out can progressively march across the PEM until the fuel cell fails completely. So, the fuel and oxidant fed to each fuel cell are usually humidified. Furthermore, a cooling mechanism is commonly employed for removal of heat generated during operation of the fuel cells.

Flow field plates are commonly produced by any of a variety of processes. One plate construction technique, which may be referred to as "monolithic" style, compresses carbon powder into a coherent mass. Next, the coherent mass is subjected to high temperature processes which bind the carbon particles together, and convert a portion of the mass into graphite for improved electrical conductivity. Then, the mass is cut into slices, which are formed into the flow field plates. Usually, each flow field plate is subjected to a sealing process (e.g., resin impregnation) in order to decrease gas permeation therethrough and reduce the risk of uncontrolled reactions. Typically, flow field channels are engraved or milled into a face of the rigid, resin-impregnated graphite plate. Undesirably, permeability of the graphite and machining processes therefor limit reduction of plate thickness. So, one is disadvantageously limited from increasing the number of corresponding fuel cells which occupy a particular volume in a fuel cell stack, and which can contribute to overall power (voltage, current) generation. Moreover, resin-impregnated graphite plates are susceptible to brittle failure and expensive in terms of cost of raw materials, as well as time for processing and tool wear in machining.

Another known configuration for a flow field plate embosses at least one flow field channel into a laminated assembly of compressible, electrically conductive sheets (i.e., graphite foil). The flow field plate has two outer layers of compressible, conductive sheet material and a center metal sheet interposed therebetween. The exterior surfaces of each of the two compressible outer layers constitute two major faces for the flow field plate. A flow field channel is embossed into at least one of these major faces. Such a design is disclosed in U.S. Pat. No. 5,527,363 to Wilkinson et al. (entitled "Method of Fabricating an Embossed Fluid Flow Field Plate," issued Jun. 18, 1996, and assigned to Ballard Power Systems Incorporated and Daimler-Benz AG) and U.S. Pat. No. 5,521,018 to Wilkinson et al. (entitled "Embossed Fluid Flow Field Plate for Electrochemical Fuel Cells," issued May 28, 1996, and assigned to Ballard Power Systems Incorporated and Daimler-Benz AG). A shortcoming of this design is the lack of a stable, integrated, metallic conduction path between the major faces. A further shortcoming is the inability to withstand extra compression without deformation, degradation, or flattening of the flow channel.

Thus, a need exists for easy formation of a fluid flow plate having enhanced toughness and satisfactory conductivity, strength, and sealing properties. A further need exists for such a fluid flow plate in which flow channels thereof can withstand increased compressive force in a fuel cell stack. In particular, a need exists for the fluid flow plate to maintain its shape so greater compressive loads can be applied to the fuel cell stack to compress gas diffusion layers adjacent to the plate, for advantageous savings of space.

SUMMARY OF THE INVENTION

Pursuant to the present invention, shortcomings of the existing art are overcome and additional advantages are provided through the provision of a fluid flow plate having conductive fibers and rigidizing material. The conductive fibers are formed into electrical path(s) extending effectively in parallel with a longitudinal axis of a fuel cell assembly that includes the fluid flow plate, which extends generally transversely with respect to the longitudinal axis. The conductive fibers are located in a section of the fluid flow plate. The conductive fibers have space(s) therebetween. The electrical path(s) are adapted to conduct electrical current generated by the fuel cell assembly. A portion of the rigidizing material is positioned in at least one of the space(s). The rigidizing material has a relatively low density. The section of the fluid flow plate includes a flow channel adapted to service fluid(s) for the fuel cell assembly.

In one aspect of the invention, the conductive fibers can be joined and/or sintered to form the electrical path(s). The electrical path(s) can resemble a conductive matrix. The conductive fibers can comprise metal (e.g., stainless steel), and the conductive fibers can be metallurgically bonded to form the electrical path(s).

The section of the fluid flow plate can include electrical contact(s) to the electrical path(s). The rigidizing material can have a relatively low fluid permeability. A quantity of the rigidizing material can fill and/or seal at least one of the space(s). The rigidizing material can include plastic resin. A number of the conductive fibers can be shaped and/or embossed for formation of the flow channel. A part of the rigidizing material can form the flow channel.

The fluid(s) can include reactant gas for a fuel cell of the fuel cell assembly. The fuel cell can comprise a PEM-type fuel cell. The section of the fluid flow plate can include substantially parallel and/or generally serpentine flow channels.

In another aspect of the invention, a fluid flow plate includes first conductive fibers, second conductive fibers, barrier material, and rigidizing material. The first and second conductive fibers are located in respective first and second sections of the fluid flow plate, which extends generally transversely with respect to a longitudinal axis of a fuel cell assembly that includes the fluid flow plate. The first and second sections of the fluid flow plate extend generally transversely at respective first and second positions along the longitudinal axis. The first conductive fibers have first space(s) therebetween. The second conductive fibers have second space(s) therebetween. The conductive barrier material is interposed between the first and second sections of the fluid flow plate. The first and second conductive fibers and the conductive barrier material form electrical path(s) extending effectively in parallel with the longitudinal axis. A first portion of the rigidizing material is positioned in at least one of the first space(s). A second portion of the rigidizing material is positioned in at least one of the second space(s). The rigidizing material has a relatively low density. The first and/or second section(s) of the fluid flow plate include a flow channel adapted to service fluid(s) for the fuel cell assembly.

In yet another aspect of the present invention, the first and second conductive fibers and the conductive barrier material can be joined and/or sintered to form the electrical path(s). The electrical path(s) can resemble a conductive matrix. The first and second conductive fibers can comprise metal, the barrier material can comprise metal foil, and the first and second conductive fibers and the barrier material can be metallurgically bonded to form the electrical path(s).

The first section of the fluid flow plate can include first electrical contact(s) to the electrical path(s). The second section of the fluid flow plate can include second electrical contact(s) to the electrical path(s). A first quantity of the rigidizing material can fill and/or seal at least one of the first space(s). A second quantity of the rigidizing material can fill and/or seal at least one of the second space(s). The first section of the fluid flow plate can include the flow channel, and a number of the first conductive fibers can be shaped and/or embossed for formation of the flow channel.

The invention further contemplates a process for constructing a fluid flow plate. First and second conductive fibers are located in respective first and second sections for the fluid flow plate. The first and second sections extend generally transversely at respective first and second positions along a longitudinal axis. The first and second conductive fibers have respective first and second space(s) therebetween. Conductive barrier material is interposed between the first and second sections. The first and second conductive fibers and the conductive barrier material are formed into electrical path(s) extending effectively in parallel with the longitudinal axis. A first portion of rigidizing material is positioned in at least one of the first space(s). A second portion of the rigidizing material is positioned in at least one of the second space(s). The rigidizing material has a relatively low density. A flow channel is formed in the first and/or second section(s).

In a further aspect of the invention, the flow channel can be formed through shaping and/or embossing the first and/or second section(s), and molding a part of the rigidizing material. A surface of the rigidizing material can be abraded to expose electrical contact(s) to the electrical path(s).

Thus, the present invention advantageously provides a simple construction for a fluid flow plate that is light-weight, conductive, tough, and considerably resistant to compression. In particular, the fluid flow plate can be a fiber-reinforced composite.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be readily understood from the following detailed description of preferred embodiments taken in conjunction with the accompanying drawings in which:

BEST MODE FOR CARRYING OUT THE INVENTION

In accordance with the principles of the present invention, a fuel cell assembly is provided in which a fluid flow plate has conductive fibers formed into continuous electrical path(s) extending between two outer faces of the fluid flow plate. The electrical path(s) form a conductive matrix, with space(s) thereabout filled and/or sealed with rigidizing material. The outer face(s) of the fluid flow plate have flow channels formed thereon. Further, surfaces of the outer face(s) of the fluid flow plate are abraded to expose electrical contacts to the underlying electrical path(s).

Figure 1:
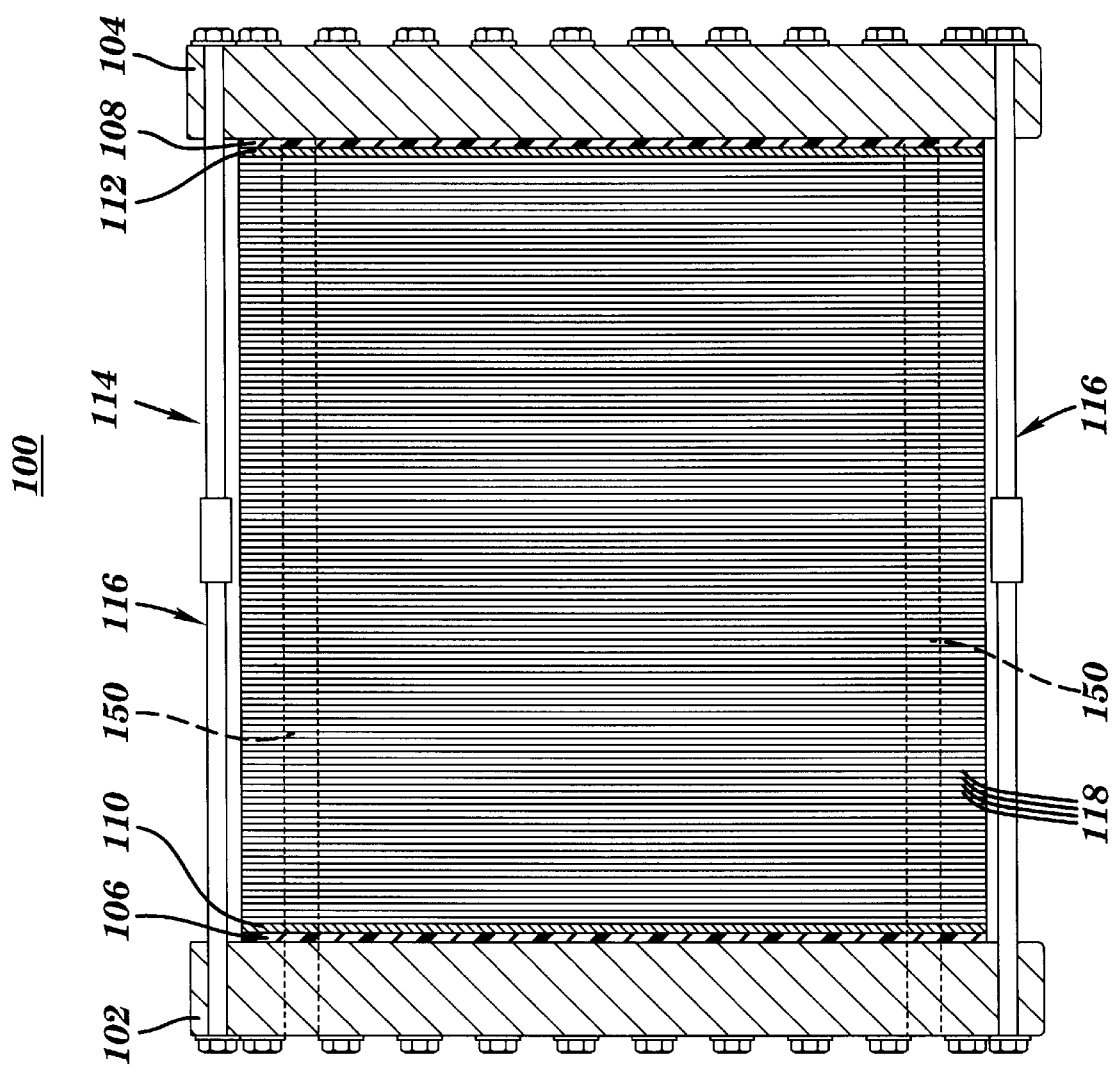
FIG. 1 is a sectional, elevation, side view of one example of a fuel cell assembly incorporating and using the fluid flow plate(s) of the present invention.

An example of a fuel cell assembly incorporating and using the novel features of the present invention is depicted in FIG. 1 and described in detail herein.

In this exemplary embodiment, a fuel cell assembly 100 includes end plates 102 and 104, insulation layers 106 and 108, and current collector/conductor plates 110 and 112, with a working section 114 therebetween. Further, the working section includes one or more active sections and can include a selected number of cooling sections, as will be understood by those skilled in the art. Also, a number of structural members 116 join the end plates, as is known in the art.

Working section 114 includes a number of layers 118. The layers generally form fluid manifolds 150 for supplying fluids to, removing fluids from, and otherwise communicating and/or servicing fluids as desired within the working section, as will be appreciated by those skilled in the art. The layers of fuel cell assembly 100 might have applied thereto compressive forces equivalent to approximately two hundred to four hundred pounds per square inch over the majority of surface of fluid flow plate 200 (FIG. 2).

Figure 3:
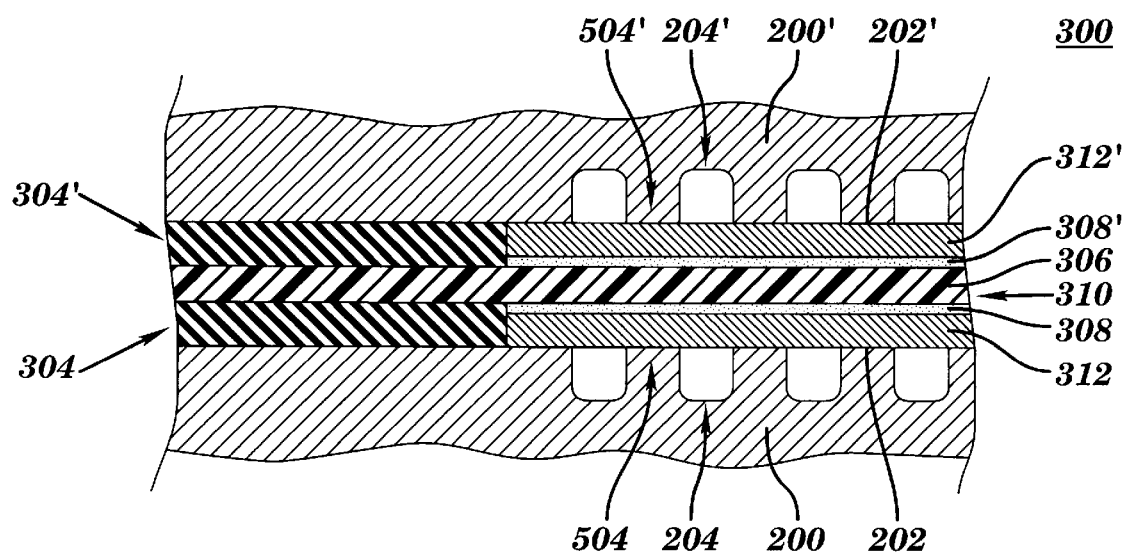
FIG. 3 is a cutaway, sectional, partial, side representation of fluid flow plates serving as flow field plates in a fuel cell of the fuel cell assembly of FIG. 1, in accordance with the principles of the present invention.

Preferably, a plurality of layers 118 form one or more (e.g., one hundred and eight) PEM-type fuel cells 300 (FIG. 3). The construction and utilization of PEM fuel cells is known in the art. By connecting an external load (not shown) between electrical contacts (not shown) of current collector/conductor plates 110 and 112, one can complete a circuit for use of current generated by the one or more PEM-type fuel cells.

Figure 2:
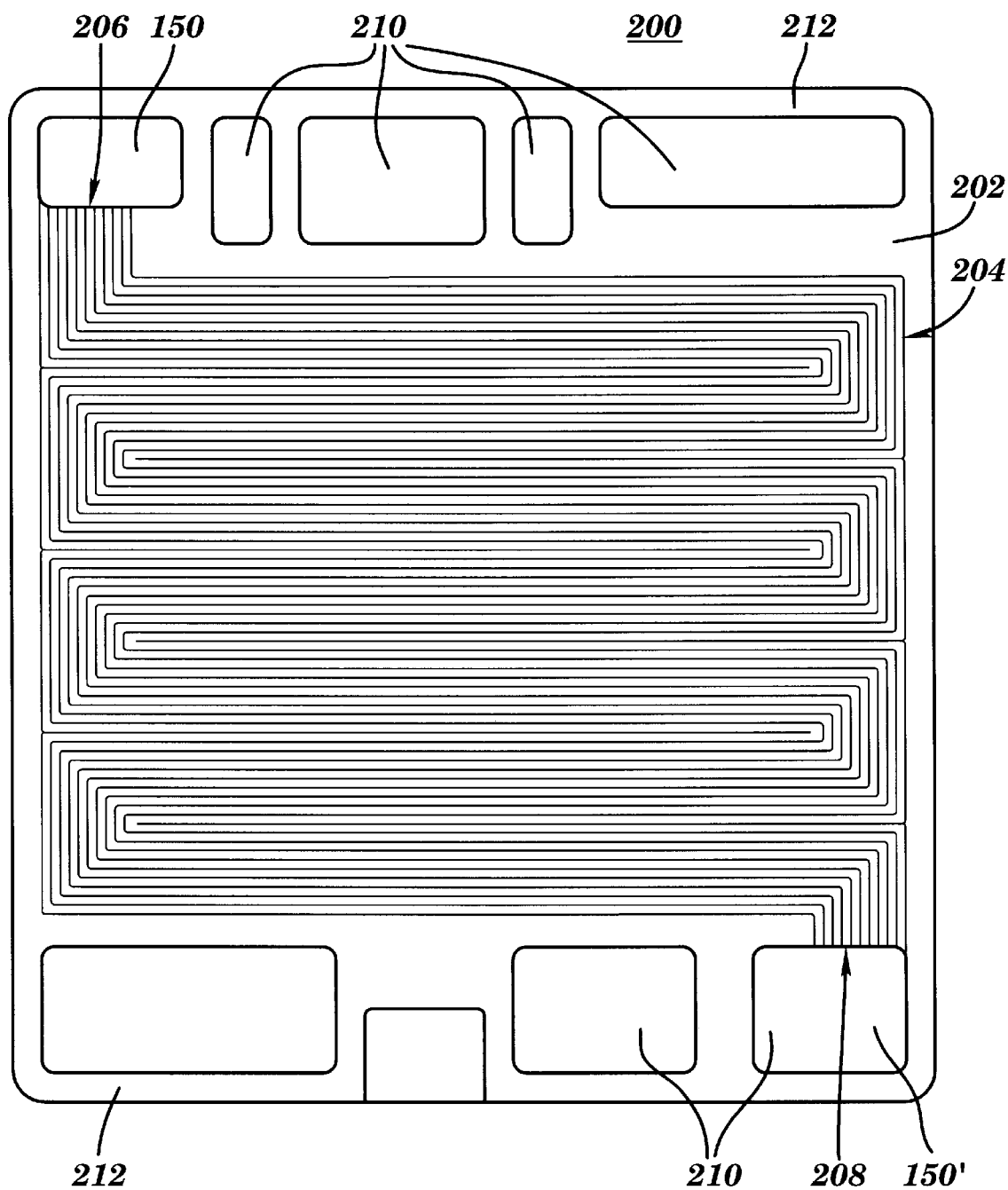
FIG. 2 is a plan view of an outer face of one example of a fluid flow plate of the fuel cell assembly of FIG. 1.

One example of a layer 118 of working section 114 is depicted in FIG. 2 as fluid flow plate 200. The plate has a fluid flow face 202 with a plurality of substantially parallel and generally serpentine flow channels 204 thereon. The flow channels receive and transmit one or more fluids through ports 206 and 208 which are in fluid communication with corresponding fluid manifolds 150 and 150'. For instance, the flow channels can include respective inlets 206 and outlets 208 in fluid communication with corresponding entry and exit fluid manifolds 150 and 150'.

As will be understood by those skilled in the art, a given fluid flow plate 200 may be a bipolar, monopolar, combined monopolar (e.g., anode cooler or cathode cooler), or cooling plate. In one example, fluid flow plate 200 serves as a flow field plate and flow channels 204 conduct fluid which includes reactant fluid for fuel cell assembly 100. The reactant fluid serves as fuel or oxidant for a given fuel cell 300 (FIG. 3). For instance, the flow channels can carry reactant gas (e.g., a fuel such as hydrogen or an oxidant such as air/oxygen) as well as liquid (e.g., humidification and/or product water), as will be understood by those skilled in the art.

A typical fluid flow plate 200 (FIG. 2) might have dimensions of 8.0 to 10.0 in. height and 7.0 to 9.0 in. width. Further, the thickness of the fluid flow plate is preferably in the range 0.05 to 0.12 in., and is most preferably in the range 0.055 to 0.070 in. Also, a given flow channel 204 (FIGS. 3 and 5) on face 202 might have cross-sectional dimensions of 0.04 to 0.06 in. width and 0.025 to 0.050 in. depth.

Referring to FIG. 2, fluid flow plate 200 has a number of peripheral holes 210 therethrough, which can cooperate in formation of fluid manifolds of fuel cell assembly 100. In one embodiment, portions of the peripheral holes are defined by arcs or rims 212 that are fixed, attached, or connected to the fluid flow plate. These rims can have any desired number of components and can be formed, for example, from the same fiber-reinforced composite which forms the fluid flow plate, or from material such as molded plastic or elastomer. Preferably, the perimeters of layers 118 are formed with minimal amounts of material disposed generally transversely beyond the active extent of working section 114 as well as the fluid manifolds of fuel cell assembly 100, as represented in FIG. 2.

As will be understood by those skilled in the art, gasketing material or gaskets 304, 304' (FIG. 3) seal peripheral holes 210 and cooperate with the longitudinal extents of layers 118 in formation of the fluid manifolds. A given gasket 304, 304' might take the form of, for instance, a frame gasket made from a polytetrafluoroethylene ("PTFE") material manufactured by E. I. DuPont de Nemours Company and sold under the trademark TEFLON®. Alternatively, multiple O-ring gaskets might be used.

For purposes of illustration, FIG. 3 depicts fuel cell 300 with fluid flow plates 200, 200' serving as flow field plates. In particular, flow field plate 200 might serve as an anode side of the fuel cell, and flow field plate 200' might serve as a cathode side of the fuel cell. That is, face 202 might be an anode face, and face 202' might be a cathode face. For instance, flow channels 204 might carry hydrogen, as fuel, and humidification water. Further, flow channels 204' might carry air/oxygen, as oxidant, as well as humidification water and/or product water, as will be understood by those skilled in the art.

Fuel cell 300 includes membrane or solid electrolyte 306. Preferably, solid electrolyte 306 is a solid polymer electrolyte made using a polymer such as a material manufactured by E. I. DuPont de Nemours Company and sold under the trademark NAFION®. Further, an active electrolyte such as sulfonic acid groups might be included in this polymer. In another example, the solid polymer electrolyte might be formed from a product manufactured by W. L. Gore & Associates (Elkton, Md.) and sold under the trademark GORE-SELECT®. Moreover, catalysts 308 and 308' (e.g., platinum), which facilitate chemical reactions, are applied to the anode and cathode sides, respectively, of the solid polymer electrolyte. This unit can be referred to as a "membrane electrode assembly" (hereinafter "MEA") 310. The MEA might be formed from a product manufactured by W. L. Gore & Associates and sold under the trade designation PRIMEA 5510-HS.

MEA 310 is sandwiched between anode and cathode gas diffusion layers (hereinafter "GDLs") 312 and 312', respectively, which can be formed from a resilient and conductive material such as carbon fabric or carbon fiber paper. In one embodiment of a gas diffusion layer 312, 312', porous carbon cloth or paper is infused with a slurry of carbon black and sintered with TEFLON® material. The anode and cathode GDLs serve as electrochemical conductors between catalyzed sites of solid polymer electrolyte 306 and the fuel (e.g., hydrogen) and oxidant (e.g., air/oxygen) which each flow in anode and cathode flow channels 204 and 204', respectively. Further, the GDLs also present to the surfaces of the MEA a combination of microscopic porosity and macroscopic porosity. Microscopic porosity allows reactant gas molecules to pass generally longitudinally from the flow channels to a surface of the MEA. Macroscopic porosity allows product water formed at the cathode surface of the MEA to be removed therefrom by flowing generally longitudinally into the cathode flow channels, to prevent flooding of the catalyst particles.

In one example, water having a pH value of approximately five might be added to a given reactant gas stream conducted by flow channels 204, 204'. The water would desirably serve to humidify membrane 306.

Figure 4:
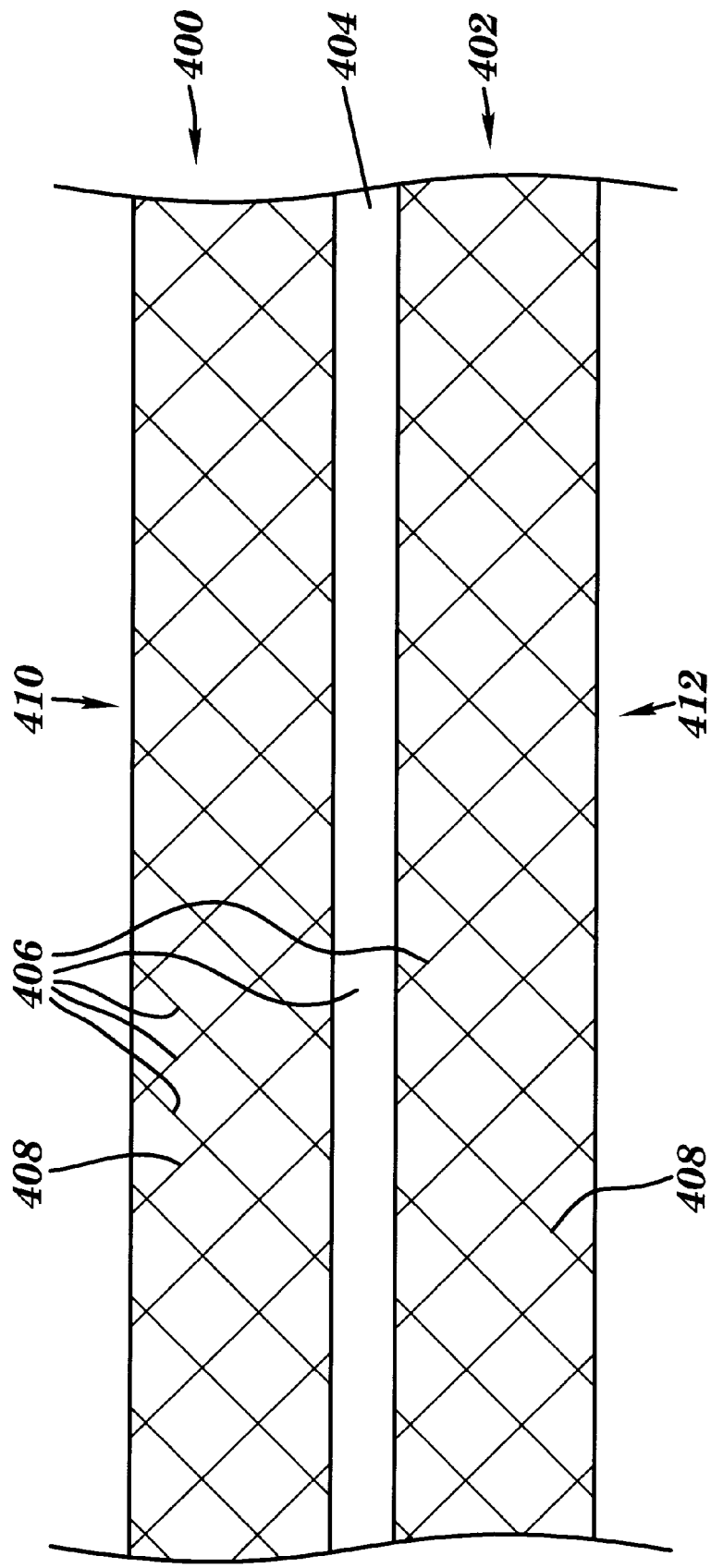
FIG. 4 is a cutaway, sectional, partial, side representation of two outer layers and a barrier layer interposed therebetween prepared to be formed into a fluid flow plate, illustrating the layers as forming a conductive matrix, in accordance with the principles of the present invention.

FIG. 4 depicts first and second outer sections or layers 400, 402 and barrier material or layer 404 interposed therebetween. Furthermore, the layers 400, 402, 404 form a number of electrical paths represented by exemplary conductive web or matrix 406, as detailed herein. Outer layers 400, 402 include conductive fibers 408. For example, each outer layer 400, 402 may comprise a stainless steel wool blanket initially having a thickness preferably in the range 0.18 to 0.38 in., and most preferably equal to approximately 0.25 in. In another example, layer(s) 400, 402 might include chopped metal fiber. The barrier layer 404 may comprise, for instance, stainless steel foil initially having a thickness preferably in the range 0.001 to 0.005 in., and most preferably in the range 0.001 to 0.003 in. As detailed herein with respect to FIG. 5, layers 400, 402, 404 are formed, assembled, joined or combined into fluid flow plate 200.

In one example, an outer layer 400, 402 might be formed from a product manufactured by Bekaert Fiber Technologies (Marietta, Ga.) and sold under the trademark BEKIPOR® WB. Further, barrier layer 404 might be formed, for instance, from stainless steel foil available commercially from Ulbrich Stainless Steels and Special Metals, Inc. (North Haven, Conn.).

Conductive matrix 406 may be formed, for example, by sintering of layers 400, 402, 404. For instance, the layers 400, 402, 404 may be heated in a vacuum, or a container of protective gas (e.g., hydrogen), to a sintering temperature, that is, a temperature at which conductive fibers 408 metallurgically bond to each other as well as to barrier layer 404, thereby creating continuous electrical paths in conductive matrix 406 between outer surfaces 410 and 412 of the respective outer layers 400 and 402.

Figure 5:
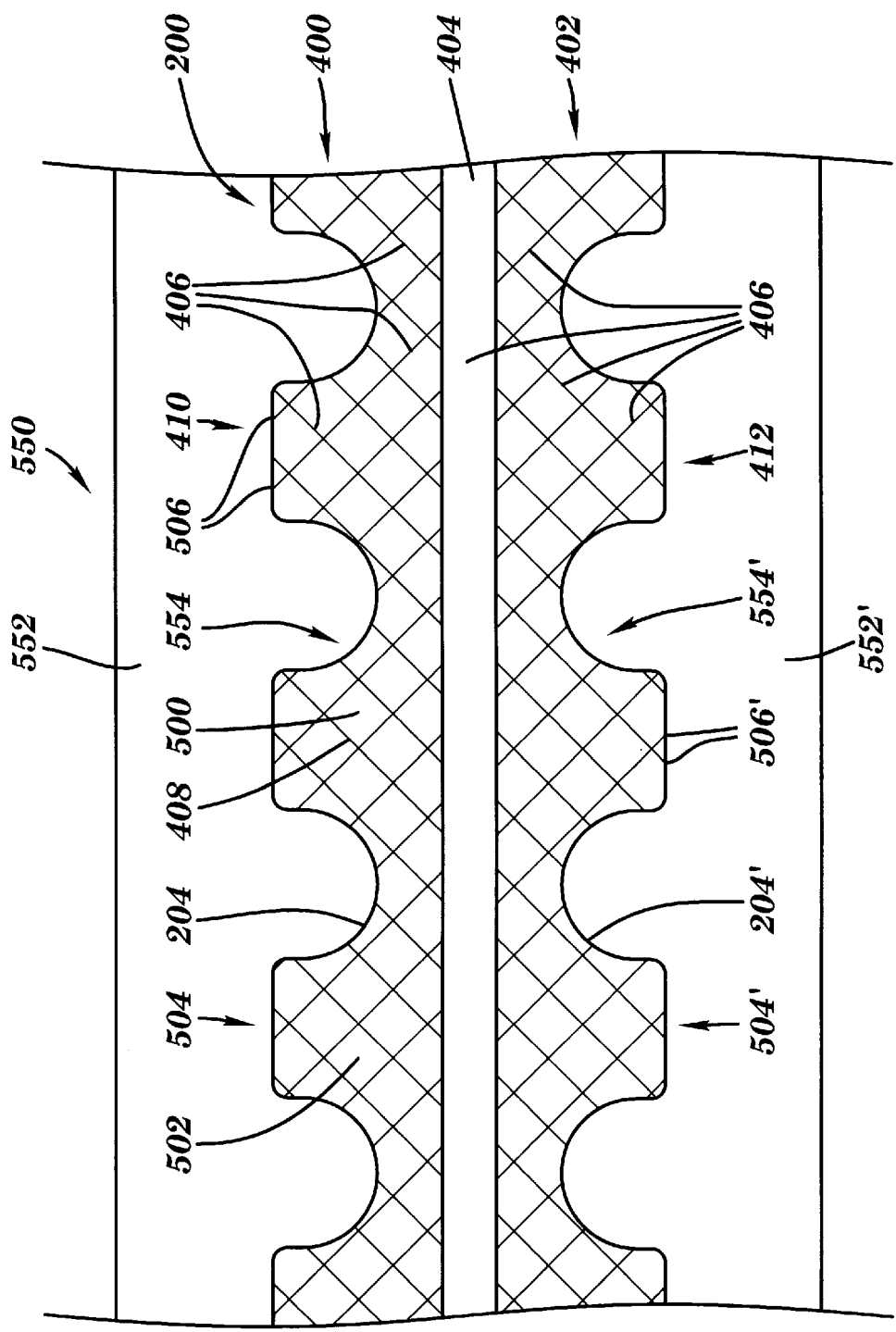
FIG. 5 is a cutaway, sectional, partial, side representation of the layers of FIG. 4 nearly formed into a fluid flow plate, illustrating flow channels formed into each outer layer by a mold and rigidizing material positioned in spaces about the conductive matrix, in accordance with the principles of the present invention.

Referring to FIG. 5, (e.g., sintered) layers 400, 402, 404 may be placed in a mold 550 (e.g., a molding die or a forming die), which preferably includes first and second forming portions 552 and 552'. The first and second forming portions serve to form flow channels 204 and 204' into corresponding outer surfaces 410 and 412 that form respective fluid flow faces 202 and 202' (FIG. 3).

A forming portion 552, 552' might be formed from any of a wide variety of commercially available tool or die steels. In one example, a forming portion 552, 552' might be formed from an air hardening die steel known in the trade as "A-2."

Referring to FIG. 5, mold 550 preferably includes roundish protuberances 554, 554' which serve to form flow channels 204, 204', respectively. Namely, the roundish protuberances, upon closing of forming portions 552 and 552' toward each other with layers 400, 402, 404 positioned therebetween, serve to guide conductive fibers 408 which are disposed obliquely with respect to the protuberances into forming and/or supporting lands 504, 504', respectively.

As depicted in FIG. 5 for purposes of illustration, protuberances 554, 554' might resemble semicircles in order to effect semicircular cross sections for flow channels 204, 204', respectively. In another example, the protuberances might resemble polygons, such as rectangles or trapezoids, with a number of roundish "corners" in order to effect flow channel cross sections having relatively flat bottoms with sloped, curved, or roundish connections to sidewalls preferably aligned generally orthogonally with respect to the bottom, as represented in FIG. 3. As illustrated in FIG. 5, the protuberances may have trunks which widen in connecting to the remainder of the mold, resulting in flow channels 204, 204' having widened mouths, which in turn may be modified to any desired degree such as during abrasion of lands 504, 504' to expose electrical contacts 506, 506' to conductive matrix 406, as discussed herein. As will be understood by those skilled in the art, numerous geometric variations for the protuberances and flow channels are possible, in accordance with the principles of the present invention.

Referring still to FIG. 5, in one preferred embodiment of the present invention, after forming of flow channels 204, 204' and while layers 400, 402, 404 are still in mold 550, rigidizing material 500 is positioned in voids or spaces 502 about conductive matrix 406 by processes such as insert molding or resin transfer molding. Namely, the rigidizing material can fill and/or seal some, many, or all of the spaces about the conductive matrix. In particular, certain space(s) could remain unfilled. That is, pocket(s) (e.g., of air) could remain between conductive fibers 408 of the conductive matrix 406, though such pocket(s) are preferably surrounded and isolated by rigidizing material 500.

Rigidizing material 500 may comprise, for instance, epoxy resin. In one example, the rigidizing material might be formed from a product manufactured by Master Bond, Inc. (Hackensack, N.J.) and sold under the trade designation EP29LPSP. Such resin systems typically have a density of 1 to 2 grams per cubic centimeter (e.g., depending on whether a filler is used), and, for illustrative purposes, may be considered to be substantially impermeable.

Furthermore, referring to FIGS. 3 and 5, abrading, sanding, or machining of lands 504, 504' on respective fluid flow faces 202, 202' desirably exposes electrical contact(s) 506, 506' to the underlying conductive matrix 406. That is, the conductive matrix and the contacts thereto advantageously provide continuous electrical paths between the fluid flow faces of fluid flow plate 200. As illustrated in FIG. 3, the electrical paths can be accessed by abutting GDLs 312, 312' through the corresponding electrical contacts 506, 506' at the lands 504, 504'. Furthermore, on the non-abraded surfaces, rigidizing material 500 serves to isolate the conductive matrix from fluid carried in flow channels 204, 204'.

In accordance with the present invention, barrier layer 404 advantageously protects against leakage of (e.g., reactant) fluid between flow channels 204 and 204' on respective opposite faces 202 and 202' of fluid flow plate 200. Desirably, the barrier layer 404 also provides dimensional stability to outer layers 400, 402 while rigidizing material 500 is positioned therein, as described above.

In an alternative embodiment of the present invention, a fluid flow plate 200 could omit barrier layer 404. Then, a single layer (e.g., an expanded layer 400 or an expanded layer 402) of conductive fibers 408 could be formed (e.g., sintered) into electrical paths for conductive matrix 406. Next, flow channels 204, 204' could be formed (e.g., shaped, embossed) onto respective fluid flow faces 202 and 202' of the fluid flow plate. Finally, rigidizing material 500 could be positioned in spaces about the conductive matrix. For purposes such as dimensional stability and leakage prevention, the single layer may comprise a stainless steel wool blanket initially having an approximate thickness of 0.50 to 1.00 in. Further, following construction, this alternative fluid flow plate might have a thickness preferably in the range 0.04 to 0.25 in., and most preferably in the range 0.06 to 0.12 in. That is, such an alternative fluid flow plate preferably has a relatively larger thickness than the fluid flow plate discussed above which includes the barrier layer 404. In one aspect, the additional thickness serves to reduce the chance of reactant permeation through the fluid flow plate.

The subject invention can advantageously decrease weight as well as cost of fluid flow plate 200 by including rigidizing (e.g., plastic resin) material 500 instead of conductive fibers (e.g., stainless steel) 408 or other conductive material, in space(s) 502 about conductive matrix 406. For instance, the fluid flow plate might have a volume which is at least eighty percent non-conductive rigidizing material 500, with the balance comprising the conductive fibers and optional filler.

By decreasing density of fluid flow plate 200 through inclusion of rigidizing material 500 therein, one can desirably increase performance of, for example, automobiles which employ fuel cell assembly 100. That is, lightening of the fuel cell assembly translates into less energy expended in transporting the fuel cell assembly in order to gain operational benefits of fuel cells 300. Those skilled in the art will appreciate the efficiencies possible from use of the present invention in a wide range of vehicular and other desired applications.

Rigidizing material 500 desirably serves to provide structural rigidity and/or strength to fluid flow plate 200. In one aspect, the rigidizing material fortifies or maintains the integrity of flow channels 204 despite increased compression applied in a longitudinal direction of fuel cell assembly 100. This longitudinal compression of the fluid flow plate and fuel cell stack 100 advantageously saves volume therein, or decreases volume thereof, at a certain power output, that is, with a certain number of fuel cells 300. Moreover, such longitudinal stack compression is advantageous to increase power output from a particular volume of the stack, that is, by increasing the number of fuel cells 300 in that particular volume. These and other advantages of the present invention will be appreciated by those skilled in the art.

In one aspect, flow channel(s) 204 may be formed with variable cross section(s), in accordance with the principles of the subject invention.

For purposes of illustration, one can consider designs contrary to the present invention. Were one to omit rigidizing material 500 from a particular fluid flow plate, then, at a certain compression level of the fuel cell stack, the particular fluid flow plate could render a corresponding fuel cell less effective or even inoperable due to flattening of flow channels. Namely, flattening of the flow channels under compression would restrict and/or choke off flow of reactant fluid flow (optionally including humidification fluid) or coolant for the corresponding fuel cell. By including rigidizing material 500 in fluid flow plate 200, the present invention advantageously addresses such problems, as described herein.

A given fluid flow plate 200 which conducts fluids on both faces 202, 202' might be configured so the fluids have, for example, parallel flow or counter flow among the various flow channels 204, 204'. In particular, a parallel flow configuration might generally transversely align flow on the opposing faces 202, 202' by positioning corresponding first and second inlets at opposite sides of a first corner of the plate, and corresponding first and second outlets at opposite sides of a generally diametrically opposed second corner of the plate. Further, a counter flow design might provide flow in generally transversely opposite directions on opposing faces 202, 202' by placing first inlet(s) and second outlet(s) at opposite sides of a first corner of the plate, and first outlet(s) and second inlet(s), respectively, at opposite sides of a generally diametrically opposed second corner of the plate.

Operation of fuel cell assembly 100 can include periods or intervals of action and inaction, such as an active use followed by idling. Also, the fuel cell assembly can be employed for varied (e.g., automotive to aerospace to industrial) applications, in various environments.

Numerous alternative embodiments of the present invention exist. Fluid flow plate 200 and/or fluid manifold(s) 150, 150' could serve any desired function in any position of fuel cell assembly 100. Further, fluid flow face 202 could easily have any number of flow channels 204. Any flow channel 204 could easily have any appropriate shape or structure. Also, flow channels 204 could easily be configured to deviate, to any desired degree, from parallel alignment and/or serpentine design. Moreover, any of ports/inlets 206 and/or ports/outlets 208 could employ any mechanism for fluid communication between appropriate flow channel(s) 204 and fluid manifold(s) 150, 150'. Fluid flow plate may include parts other than layers 400, 402, 404 and rigidizing material 500. Design choices permit variation in construction technique(s) and/or material(s) for any portion of fluid flow plate 200 and/or fuel cell assembly 100. Furthermore, fluid flow plate(s) 200 could easily be employed in any appropriate type(s) of fuel cell(s). Additionally, working section 114 could easily include any desired type(s) of fuel cell(s).

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A fluid flow plate for a fuel cell assembly, said fuel cell assembly having a longitudinal axis, said fluid flow plate extending generally transversely with respect to said longitudinal axis, said fluid flow plate comprising:

a plurality of first conductive fibers located in a section of said fluid flow plate, said first conductive fibers having a number of spaces therebetween;

a plurality of second conductive fibers;

metal foil located between said first conductive fibers and said second conductive fibers;

said first and second conductive fibers and said metal foil comprising at least one electrical path extending effectively in parallel with said longitudinal axis, said at least one electrical path adapted to conduct electrical current generated by said fuel cell assembly;

rigidizing material including a portion positioned in at least one of said spaces, said rigidizing material having a relatively low density; and said section including a flow channel adapted to service at least one fluid for said fuel cell assembly.

2. The fluid flow plate of claim 1, wherein said first conductive fibers are at least one of joined and sintered for said at least one electrical path.

3. The fluid flow plate of claim 1, wherein said at least one electrical path comprises a conductive matrix.

4. The fluid flow plate of claim 1, wherein said first conductive fibers comprise metal and said first conductive fibers are metallurgically bonded for said at least one electrical path.

5. The fluid flow plate of claim 4, wherein said metal comprising said first conductive fibers includes stainless steel.

6. The fluid flow plate of claim 1, wherein said section includes at least one electrical contact to said at least one electrical path.

7. The fluid flow plate of claim 1, wherein said rigidizing material serves to decrease fluid permeability of said plate.

8. The fluid flow plate of claim 1, wherein a quantity of said rigidizing material at least one of fills and seals at least one of said spaces.

9. The fluid flow plate of claim 1, wherein said rigidizing material includes plastic resin.

10. The fluid flow plate of claim 1, wherein a number of said first conductive fibers are at least one of shaped and embossed for formation of said flow channel.

11. The fluid flow plate of claim 1, wherein a part of said rigidizing material forms said flow channel.

12. The fluid flow plate of claim 1, wherein said at least one fluid includes reactant gas for a fuel cell of said fuel cell assembly.

13. The fluid flow plate of claim 12, wherein said fuel cell comprises a PEM fuel cell.

14. The fluid flow plate of claim 1, wherein said section includes a plurality of flow channels which are at least one of substantially parallel and generally serpentine.

15. A fluid flow plate of a fuel cell assembly, said fuel cell assembly having a longitudinal axis, said fluid flow plate extending generally transversely with respect to said longitudinal axis, said fluid flow plate comprising:

a plurality of first conductive fibers located in a first section extending generally transversely at a first position along said longitudinal axis, said first conductive fibers having a number of first spaces therebetween;

a plurality of second conductive fibers located in a second section extending generally transversely at a second position along said longitudinal axis, said second conductive fibers having a number of second spaces therebetween;

metal foil interposed between said first and second sections;

said first and second conductive fibers and said metal foil comprising at least one electrical path extending effectively in parallel with said longitudinal axis;

rigidizing material including first and second portions, said first portion positioned in at least one of said first spaces, said second portion positioned in at least one of said second spaces, said rigidizing material having a relatively low density; and at least one of said first and second sections including a flow channel adapted to service at least one fluid for said fuel cell assembly.

16. The fluid flow plate of claim 15, wherein said first and second conductive fibers and said metal foil are at least one of joined and sintered to form said at least one electrical path.

17. The fluid flow plate of claim 15, wherein said at least one electrical path comprises a conductive matrix.

18. The fluid flow plate of claim 15, wherein said first and second conductive fibers comprise metal, and wherein said first and second conductive fibers and said metal foil are metallurgically bonded to form said at least one electrical path.

19. The fluid flow plate of claim 15, wherein said first section includes at least one first electrical contact to said at least one electrical path, wherein said second section includes at least one second electrical contact to said at least one electrical path.

20. The fluid flow plate of claim 15, wherein a first quantity of said rigidizing material at least one of fills and seals at least one of said first spaces, wherein a second quantity of said rigidizing material at least one of fills and seals at least one of said second spaces.

21. The fluid flow plate of claim 15, wherein said first section includes said flow channel, wherein a number of said first conductive fibers are at least one of shaped and embossed for formation of said flow channel.

22. A process for constructing a fluid flow plate, said process comprising:

locating a plurality of first conductive fibers in a first section for said fluid flow plate, said first section extending generally transversely at a first position along a longitudinal axis, said first conductive fibers having a number of first spaces therebetween;

locating a plurality of second conductive fibers in a second section for said fluid flow plate, said second section extending generally transversely at a second position along said longitudinal axis, said second conductive fibers having a number of second spaces therebetween;

interposing metal foil between said first and second sections;

forming said first and second conductive fibers and said metal foil into at least one electrical path extending effectively in parallel with said longitudinal axis;

positioning a first portion of rigidizing material in at least one of said first spaces, said rigidizing material having a relatively low density;

positioning a second portion of said rigidizing material in at least one of said second spaces; and forming a flow channel in at least one of said first and second sections.

23. The process of claim 22, wherein said forming of said flow channel includes at least one of shaping and embossing said at least one of said first and second sections and molding a part of said rigidizing material.

24. The process of claim 22, further comprising the step of abrading a surface of said rigidizing material to expose at least one electrical contact to said at least one electrical path.

* * * * *